though a gas discharge device. Means is provided whereby whenever the input exceeds predetermined limits in either direction the gas discharge device is extinguished and the diode is back-biased to provide a high impedance at the input of the amplifier. The capacitor, as a result of the back-bias of the diode and extinguished gas tube, has no discharge path. Hence the capacitor retains its charge, maintaining a constant level in the input with relation to the output as determined by the existing charge on the capacitor.

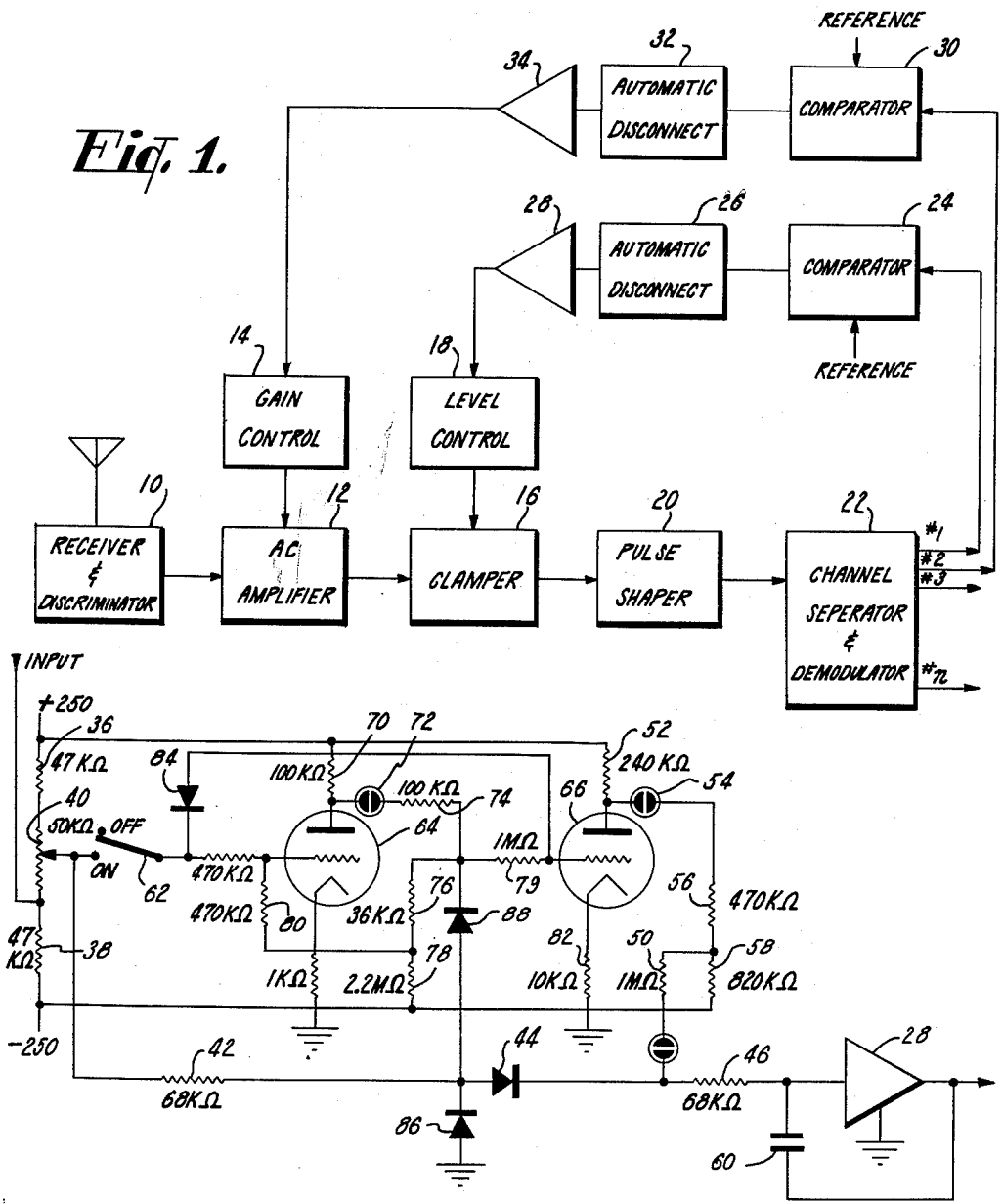

For a better understanding of the invention reference should be had to the accompanying drawing, wherein:

FIG. 1 is a block diagram of one system incorporating the servo disconnect feature of the present invention; and FIG. 2 is a schematic wiring diagram of the automatic disconnect circuit.

In copending application Serial No. 798,456, filed Mar. 10, 1959, in the name of the present inventor and assigned to the same assignee, there is described a decommutating system for time shared pulse-amplitude modulation signals. The system therein described comprises, as shown in the block diagram of FIG. 1 of the present application, a suitable receiver and FM discriminator circuit indicated generally at 10, the output of which provides the time shared pulse information signal derived from a remote telemetering station (not shown). The time shared pulse information signal is amplified in an A.C. amplifier 12 having a gain control circuit 14. The output of the A.C. amplifier is applied to a clamper circuit 16 for restoring the D.C. level to the time shared pulse information. The base level of the pulse train at the output of the clamper is set by a level control circuit 18.

The output of the clamper 16 is then applied to a pulse shaper circuit for deriving noise-free information pulses which are then applied to a decommutating or channel separator and demodulator circuit 22 by which the pulse information is divided into the separate channels and demodulated to derive the respective channel analog signals in decommutated form.

Automatic control of the gain of the amplifier 12 and the base level produced by the clamper 16 may be servo controlled from zero and fullscale reference information transmitted in the first and second channels from the sending station. For instance, pulses whose amplitudes represent zero input signals for that channel at the sending station provide a zero reference at the output of the #1 channel from the channel separator and demodulator circuit 22. Similarly pulses whose amplitudes represent fullscale provide a fullscale reference at the output of the #2 channel from the channel separator and decommutator circuit 22.

For servo control, the #1 channel output is connected to a comparison circuit where the output level is compared with a fixed reference voltage. The difference is applied through an automatic servo disconnect circuit 26, amplified by a D.C. amplifier 28, and applied to the level control circuit 18 to adjust the level of the clamper circuit 16 so as to produce a corrected zero output level from the #1 channel.

Similarly the #2 channel is applied to a comparison circuit 30 where the fullscale output is compared with a fixed reference voltage, the difference being applied through an automatic disconnect circuit 32 and D.C. amplifier 34 to the gain control circuit 14. Thus the gain of the amplifier 12 is automatically controlled to provide a corrected fullscale level at the output of the #2 channel. Once the gain of the amplifier 12 and level of the clamper circuit 16 are set for fullscale and zero reference respectively, proper gain and level is established for all of the information channels.

The automatic disconnect circuits 26 and 32 are arranged as hereinafter described in detail to automatically disconnect the output from the comparison circuits from the D.C. amplifiers 28 and 34 respectively. At the same time the automatic disconnect circuits 26 and 32 are arranged to maintain the output of the D.C. amplifiers at their existing levels indefinitely or until the output of the comparator circuits return to values within a predetermined range.

Referring to FIG. 2, a schematic circuit diagram is shown for the automatic disconnect circuit 26 of FIG. 1. As shown in FIG. 2, the comparison circuit comprises a resistance voltage divider network connected between a +250 v. and −250 v. fixed voltage reference. The comparison circuit includes two fixed resistors 36 and 38 on either side of a potentiometer 40. The output from the comparison circuit is derived from the sliding contact of the potentiometer 40. The input, derived from the #1 channel of the channel separator and demodulator 22, is connected to the junction between the resistor 38 and the potentiometer 40. The potentiometer is preferably set so that the output of the comparison circuit is three or four volts positive with relationship to the level of the #1 channel input, which input normally ranges around zero volts potential with respect to ground.

The output derived from the sliding contact of the potentiometer 40 is connected to the D.C. amplifier 28 through a first series resistor 42, a diode 44, and a second series resistor 46. The diode 44 is normally forward biased by means of a neon tube or other gas discharge device 48 which is connected through a large series resistor 50 to a normally negative potential derived on a voltage divider consisting of a resistor 52, a neon or other gas discharge device 54, and resistors 56 and 58 connected between the positive and negative reference voltage sources. Because of the relatively large resistor 50, very small current is drawn through the gas discharge tube 48.

From the circuit thus far described it will be apparent that any changes in the level at the #1 channel input to the comparison circuit will change the level at the input of the amplifier 28 to produce a corresponding amplified change in level at the output of the amplifier 28.

During automatic disconnect operation, the neon tube 48 is extinguished and the diode 44 is back biased so as to provide a very high input impedance and, in effect, disconnecting the input to the amplifier 28. A capacitor 60 connects the output of the amplifier 28 to the input and normally assumes a charge determined by the difference in level of the input and output of the amplifier 28. During disconnect operation, with the neon tube 48 extinguished and the diode 44 back-biased in a manner hereafter described, no discharge path for the capacitor 60 is available and it retains its charge indefinitely thereby maintaining the level at the output of the amplifier 28 at its existing level at the time the input is automatically disconnected.

To cut off the gas discharge tube 48, the automatic discharge circuit senses the level at the output of the comparison circuit at the sliding contact of the potentiometer 40 through an on-off switch 62. Only when the switch 62 is closed is the automatic disconnect feature in operation. The disconnect circuit includes two direct-coupled stages including triodes 64 and 66. The first stage includes a cathode resistor 68 and plate load resistor 70. The plate of the first stage is connected to the grid of the second stage through a neon tube 72 which provides sufficient voltage drop to establish the proper bias level of the grid of the second stage. In series with the neon tube 72 is a resistor 74 which is part of a voltage divider network including resistors 76 and 78 returning to the negative potential source. The grid of the second stage is connected through a very large resistor 79 to the series junction point between the resistors 74 and 76.

Large negative feedback is applied to the grid of the first stage by connecting the series junction point between the resistors 76 and 78 through a resistor 80 to the grid of the triode 64. This negative feedback provides substantially unity gain for the first stage. Thus the first stage serves primarily as a phase reversing means, since the output level moves in the opposite direction to changes in the level of the input.

The resistor 52 provides the plate load resistor for the second stage 66 which also includes a cathode bias resistor 82. If a positive-going transient in the form of a step voltage, for example, is derived from the #1 channel input, it will be seen that the plate of the second stage is driven positive. This causes the series junction point between the resistors 56 and 58 to become less negative, causing the neon tube 48 to be extinguished. If a negative transient exists at the input to the comparator circuit 24, the grid of the second stage is again driven negative by virue of a diode 84 which bypasses the first stage. Thus a negative transient for a step function voltage also drives the plate of the second stage positive and extinguishes the neon tube 48.

At the same time the diode 44, which is normally forward biased, is back-biased when the neon tube 48 is extinguished by virtue of a pair of diodes 86 and 88 connected respectively between the anode of the diode 44 and ground and the anode of the diode 44 and the output of the first stage at the junction of the resistors 74 and 76. Under normal operating conditions the anode of the diode 44 is positive and both the diodes 86 and 88 are back biased so as to be nonconductive. If a negative transient is applied to the input of the automatic disconnect circuit of sufficient magnitude to extinguish the tube 48, the diode 86 is rendered conductive through the resistor 42. The diode 86 clamps the anode of the diode 44 to a potential slightly negative with respect to ground, and since the input to the amplifier 28 is normally slightly positive with respect to ground, the anode 44 is back biased, thereby providing a high impedance to the capacitor 60. The diode 88 remains back biased since its cathode is driven more positive by the negative-going transient on the input of the first stage 64.

When a positive-going transient or step function voltage is applied to the input of the automatic disconnect circuit which is of sufficient magnitude to extinguish the tube 48, since the cathode of the diode 88 normally goes negative with respect to ground potential, the diode 88 is also rendered conductive. This causes the diode 86 to conduct, clamping the anode of the diode 44 at a potential slightly negative with respect to ground and back-biasing the diode 44.

Thus it will be seen that for both negative or positive going transients exceeding a limited voltage range, the neon tube 48 is extinguished and the diode 44 is back biased thus isolating the input to the amplifier 28. Whenever the input returns to the normal range of operation, the neon tube 48 is again ignited and forward-biasing of the diode 44 is restored, permitting the output of the amplifier 28 to again track changes in the reference level of the #1 channel input.

The automatic disconnect circuit 32 for the fullscale servo of FIG. 1 is identical to that described in FIG. 2. However, the comparison circuit is arranged slightly different because the normal level of the #2 channel signal is in a range substantially positive with respect to ground. otherwise operation is identical as described above in connection with FIG. 2.

From the above description it will be recognized that an automatic disconnect circuit has been provided which is particularly useful in providing automatic disconnect of servos when input conditions exceed normal operating limits. The circuit has the feature that it is automatically resetting when the transient condition passes and input conditions returned to normal operating ranges. The circuit is also unique in that it provides for sustaining the output at the existing level indefinitely at the time a transient condition occurs. It will be noted that only abrupt changes in the zero or fullscale reference signals will operate the disconnect circuit. Slow changes are "washed out" by the action of the servo loop. The input to the disconnect circuit can only change in response to transients which change the reference level too quickly for the servo to follow.

What is claimed is:

1. In a closed loop followup servo system, apparatus for automatically disconnecting the servo loop and locking the servo output to the existing output level, the apparatus comprising a direct current amplifier, a capacitor coupling the output to the input of the amplifier, a first diode in series with the input of the amplifier for coupling a control signal to the amplifier input, means for normally biasing the series diode in a conductive state including a normally conductive gas discharge tube connected to the input of the amplifier to provide a current conductive path for the first diode, the input level of the amplifier changing with changes in the voltage level of the control signal, means responsive to the control signal for extinguishing the discharge tube when the control signal varies in voltage above and below predetermined limits, a first diode clamping circuit coupled to the series diode for limiting the negative swing of the control signal input to the amplifier, a second diode clamping circuit coupled to the series diode for limiting the positive swing of the control signal input including means for reducing the clamping level as the control signal input increases beyond a predetermined level, whereby the series diode is always back-biased when the gas discharge tube is extinguished.

2. Automatic disconnect apparatus for automatically disconnecting an input terminal from an output terminal when the potential applied to the input terminal exceeds a normal operating range, the apparatus comprising means including a first diode providing a current path between the input terminal and the output terminal, means for normally biasing the series diode in a conductive state including a normally conductive gas discharge tube connected to the output terminal to provide a current conductive path for the first diode, means responsive to the potential level of the input terminal for extinguishing the discharge tube when the level of the input terminal varies in voltage above and below said normal operating range, a first diode clamping circuit connected to the series diode for limiting the negative swing of the series diode in relation to the input terminal, a second diode clamping circuit coupled to the series diode for limiting the positive swing of the series diode in relation to the input terminal including means for reducing the clamping level as the input terminal increases beyond a predetermined level, whereby the series diode is always back-biased when the gas discharge tube is extinguished.

3. An automatic signal disconnect circuit comprising a signal source of varying potential with relation to ground reference, the potential normally varying within a limited range, a resistor and first diode connected in series with the output of the signal source, a high resistance current path including a gas discharge tube connected to the first diode, means for normally applying potential across the resistor, first diode and gas discharge tube of sufficient magnitude to maintain the gas discharge tube conductive, the first diode being connected to be forward biased by said applied potential, means responsive to changes in potential of the signal source above or below the normal operating range for reducing the potential across the gas discharge tube and extinguishing the tube, a first clamping diode connected to the series junction point between the resistor and first diode and connected to a fixed potential reference, the first clamping diode normally being back-biased by the potential reference to render it nonconductive, a second clamping diode, phase-inverting means connected to the signal source to provide a potential source that decreases when the potential of the signal source increases, the second clamping diode being connected to a series junction point between the resistor and said first diode and connected to the output of the phase-inverting means, the second clamping diode normally being back-biased by the output of the phase-inverting means when the signal source is within the normal operating range, the output from the automatic disconnect circuit being derived from the series diode.

4. Apparatus as defined in claim 3 further including a direct coupled amplifier having the input thereto being connected to the first diode through a series resistor, and a capacitor connecting the output of the amplifier to the input, the capacitor fixing the level at the input to the amplifier when the gas discharge tube is extinguished and the first diode is back-biased.

5. A switching circuit having an input terminal and an output terminal, the switching circuit automatically disconnecting the output terminal from the input terminal when the potential applied to the input terminal exceeds either the upper limit or lower limit of a predetermined operating range, the circuit comprising means including an isolation diode connecting the input terminal to the output terminal, high impedance means connected in series with the diode for normally biasing the diode in the forward direction with relation to the input terminal, whereby potential changes at the input terminal produce potential changes at the output terminal, means responsive to changes in the potential of the input terminal which exceed either the upper limit or the lower limit of the operating range for electrically disconnecting said high impedance means from the diode, and means responsive to changes in the potential of the input terminal which exceed either the upper limit or the lower limit of the operating range for back-biasing the diode when the high impedance means has been disconnected to provide a high impedance at the output terminal, said last-named means including means for clamping the diode to a fixed reference potential.

6. Apparatus as defined in claim 5 wherein the clamping means includes first and second diodes connected in series with each other, the series junction point of the two series diodes being connected to the isolation diode on the opposite side of the isolation diode from the output terminal, and phase inverting means coupled between the input terminal and the two series diodes for varying the potential across the series diodes inversely with changes in the potential of the input terminal.

7. Apparatus as defined in claim 5 wherein said high impedance means includes a gas discharge tube and a high series resistance connected to the output terminal side of an isolation diode, and means responsive to changes in the potential at the input terminal in excess of the limits of said operating range for decreasing the potential across the gas discharge tube and series resistor to a value less than is required to sustain the ionization of the discharge tube.

8. Apparatus as defined in claim 6 wherein said high impedance means includes a gas discharge tube and a high series resistance connected to the output terminal side of an isolation diode, and means responsive to changes in the potential at the input terminal in excess of the limits of said operating range for decreasing the potential across the gas discharge tube and series resistor to a valve less than is required to sustain the ionization of the discharge tube.

References Cited in the file of this patent
UNITED STATES PATENTS

| | | |
|---|---|---|
| 1,984,065 | Greenwood | Dec. 11, 1934 |
| 2,247,468 | Barr et al. | July 1, 1941 |
| 2,652,488 | Smeltzer et al. | Sept. 15, 1953 |
| 2,829,247 | Thomas | Apr. 1, 1958 |
| 2,930,987 | Groce | Mar. 24, 1960 |